US012602161B2

(12) United States Patent
Catherwood et al.

(10) Patent No.: US 12,602,161 B2
(45) Date of Patent: Apr. 14, 2026

(54) ACCELERATED READ, MODIFY, WRITE OPERATIONS

(71) Applicant: Microchip Technology Incorporated, Chandler, AZ (US)

(72) Inventors: Michael Catherwood, Tyler, TX (US); David Mickey, Chandler, AZ (US); Ashish Desai, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 213 days.

(21) Appl. No.: 17/990,013

(22) Filed: Nov. 18, 2022

(65) Prior Publication Data

US 2023/0176738 A1      Jun. 8, 2023

Related U.S. Application Data

(60) Provisional application No. 63/285,769, filed on Dec. 3, 2021.

(51) Int. Cl.
G06F 3/06 (2006.01)

(52) U.S. Cl.
CPC .......... G06F 3/0611 (2013.01); G06F 3/0659 (2013.01); G06F 3/0673 (2013.01)

(58) Field of Classification Search
CPC .... G06F 3/0611; G06F 3/0659; G06F 3/0673; G06F 3/064; G06F 3/0689
See application file for complete search history.

(56) References Cited

U.S. PATENT DOCUMENTS

| | | | | | |
|---|---|---|---|---|---|
| 4,370,709 | A | * | 1/1983 | Fosdick | ................ G06F 9/3017 |
| | | | | | 712/E9.037 |
| 5,333,296 | A | * | 7/1994 | Bouchard | ............. G06F 9/3802 |
| | | | | | 712/E9.046 |
| 5,657,484 | A | * | 8/1997 | Scarra | ................. G06F 9/30029 |
| | | | | | 712/223 |
| 6,195,106 | B1 | * | 2/2001 | Deering | ................ G06T 15/005 |
| | | | | | 345/545 |

(Continued)

FOREIGN PATENT DOCUMENTS

WO         WO-9411815 A1 *   5/1994   ............... G06F 9/52

OTHER PUBLICATIONS

International Search Report and Written Opinion, Application No. PCT/US2022/051061, 13 pages, Mar. 15, 2023.

*Primary Examiner* — Jared I Rutz
(74) *Attorney, Agent, or Firm* — SLAYDEN GRUBERT BEARD PLLC

(57) ABSTRACT

An article of manufacture includes a non-transitory machine-readable medium. The medium includes instructions. The instructions, when read and executed by a processor, cause the processor to determine that a first input instruction in a code stream to be executed is to perform a read-modify-write operation, determine that the first input instruction is to target a memory location, and, based on a determination that the first input instruction is to perform the read-modify-write operation and the determination that the first input instruction is to target the memory location, convert the first input instruction to a second input instruction to target the memory location with a mask to cause an atomic operation to implement the read-modify-write operation.

28 Claims, 6 Drawing Sheets

400

405
Identify a first input instruction in a code stream to be executed.

410
Determine that the first input instruction is to perform a read-modify-write operation to target a memory location.

415
Based on a determination that the first input instruction is to perform the read-modify-write operation to target the memory location, convert the first input instruction to a second input instruction to target the memory location with a mask to cause an atomic operation to implement the read-modify-write operation.

(56) References Cited

U.S. PATENT DOCUMENTS

| | | | | |
|---|---|---|---|---|
| 7,174,405 B1 * | 2/2007 | Dumov | ............... | G06F 13/4243 |
| | | | | 710/200 |
| 2001/0042179 A1 * | 11/2001 | Ciavaglia | ............ | G06F 12/1458 |
| | | | | 711/155 |
| 2007/0180006 A1 | 8/2007 | Gyoten et al. | ................ | 708/200 |
| 2016/0294400 A1 * | 10/2016 | Kuo | ....................... | H03L 7/0802 |
| 2017/0192710 A1 * | 7/2017 | Pundir | .................. | G06F 3/0644 |
| 2018/0341432 A1 * | 11/2018 | Ware | .................... | G11C 7/1006 |
| 2020/0310684 A1 * | 10/2020 | Fowler | .................. | G06F 3/0659 |
| 2021/0181977 A1 * | 6/2021 | Han | ....................... | G06F 3/0683 |
| 2024/0230911 A1 * | 7/2024 | Al Abbas | .............. | G01S 17/894 |

* cited by examiner

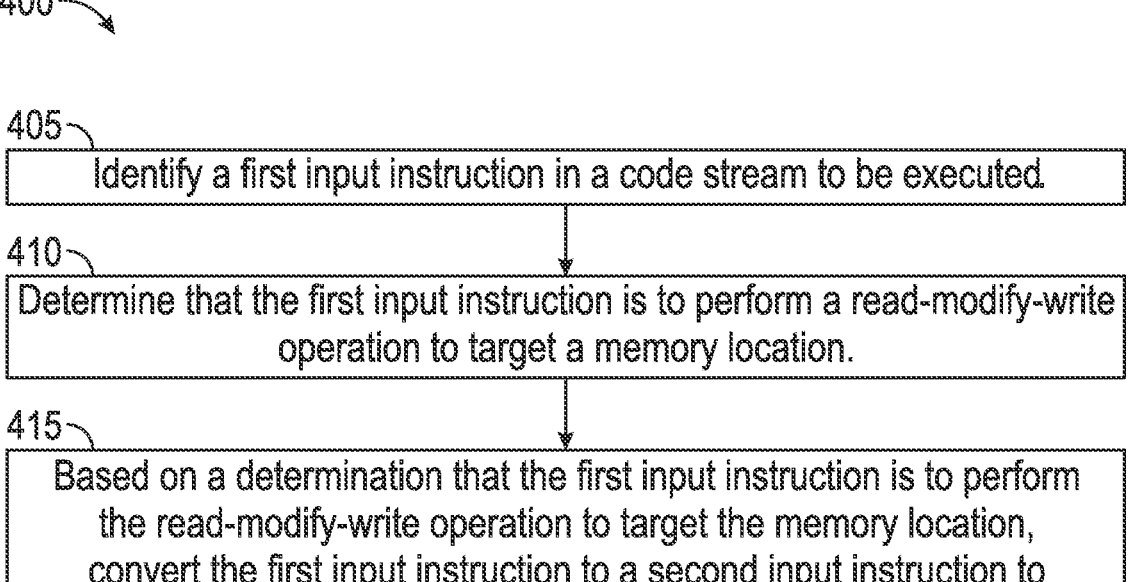

400

405
Identify a first input instruction in a code stream to be executed.

410
Determine that the first input instruction is to perform a read-modify-write operation to target a memory location.

415
Based on a determination that the first input instruction is to perform the read-modify-write operation to target the memory location, convert the first input instruction to a second input instruction to target the memory location with a mask to cause an atomic operation to implement the read-modify-write operation.

FIG. 4

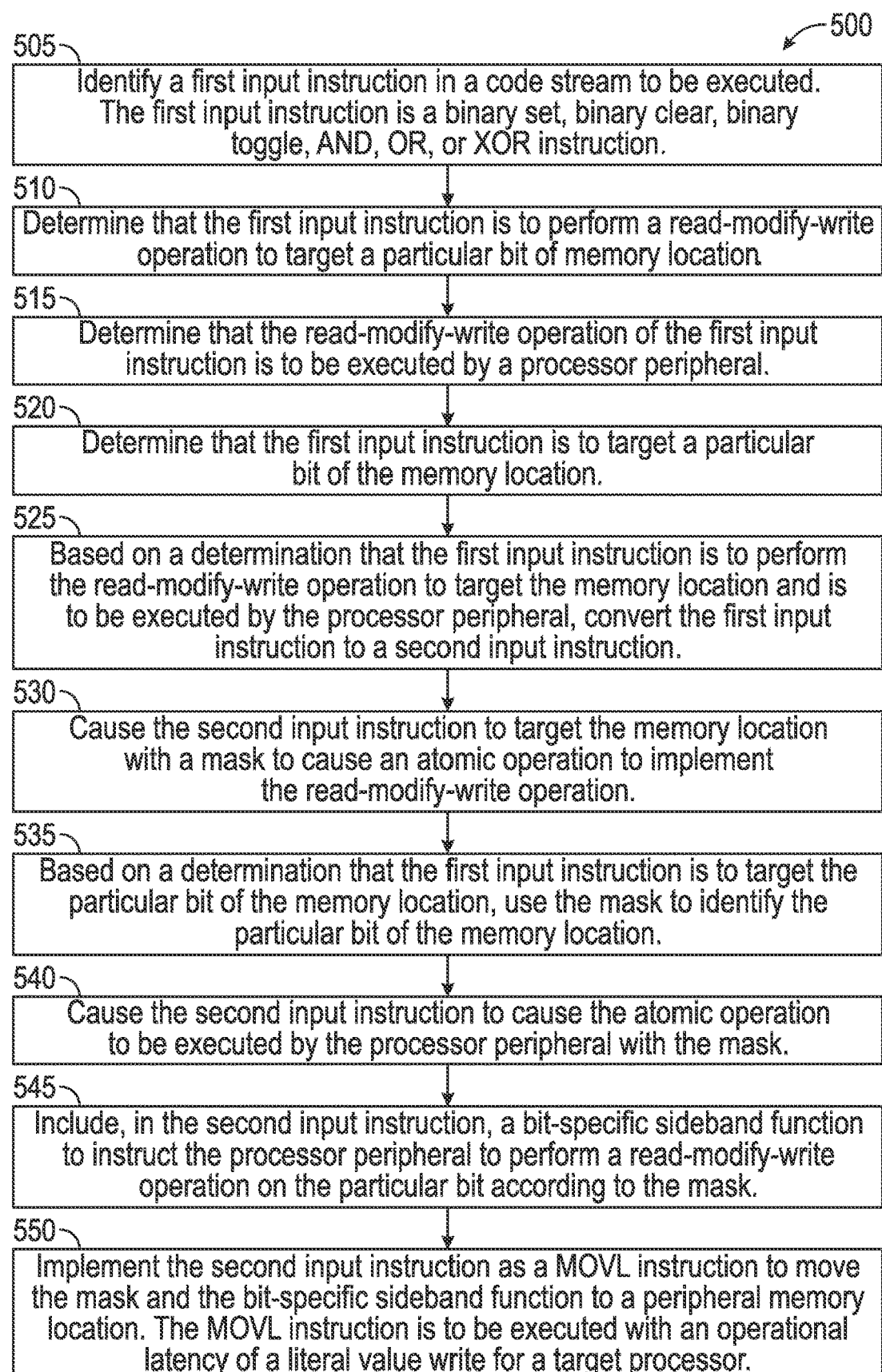

500

505
Identify a first input instruction in a code stream to be executed.
The first input instruction is a binary set, binary clear, binary
toggle, AND, OR, or XOR instruction.

510
Determine that the first input instruction is to perform a read-modify-write
operation to target a particular bit of memory location.

515
Determine that the read-modify-write operation of the first input
instruction is to be executed by a processor peripheral.

520
Determine that the first input instruction is to target a particular
bit of the memory location.

525
Based on a determination that the first input instruction is to perform
the read-modify-write operation to target the memory location and is
to be executed by the processor peripheral, convert the first input
instruction to a second input instruction.

530
Cause the second input instruction to target the memory location
with a mask to cause an atomic operation to implement
the read-modify-write operation.

535
Based on a determination that the first input instruction is to target the
particular bit of the memory location, use the mask to identify the
particular bit of the memory location.

540
Cause the second input instruction to cause the atomic operation
to be executed by the processor peripheral with the mask.

545
Include, in the second input instruction, a bit-specific sideband function
to instruct the processor peripheral to perform a read-modify-write
operation on the particular bit according to the mask.

550
Implement the second input instruction as a MOVL instruction to move
the mask and the bit-specific sideband function to a peripheral memory
location. The MOVL instruction is to be executed with an operational
latency of a literal value write for a target processor.

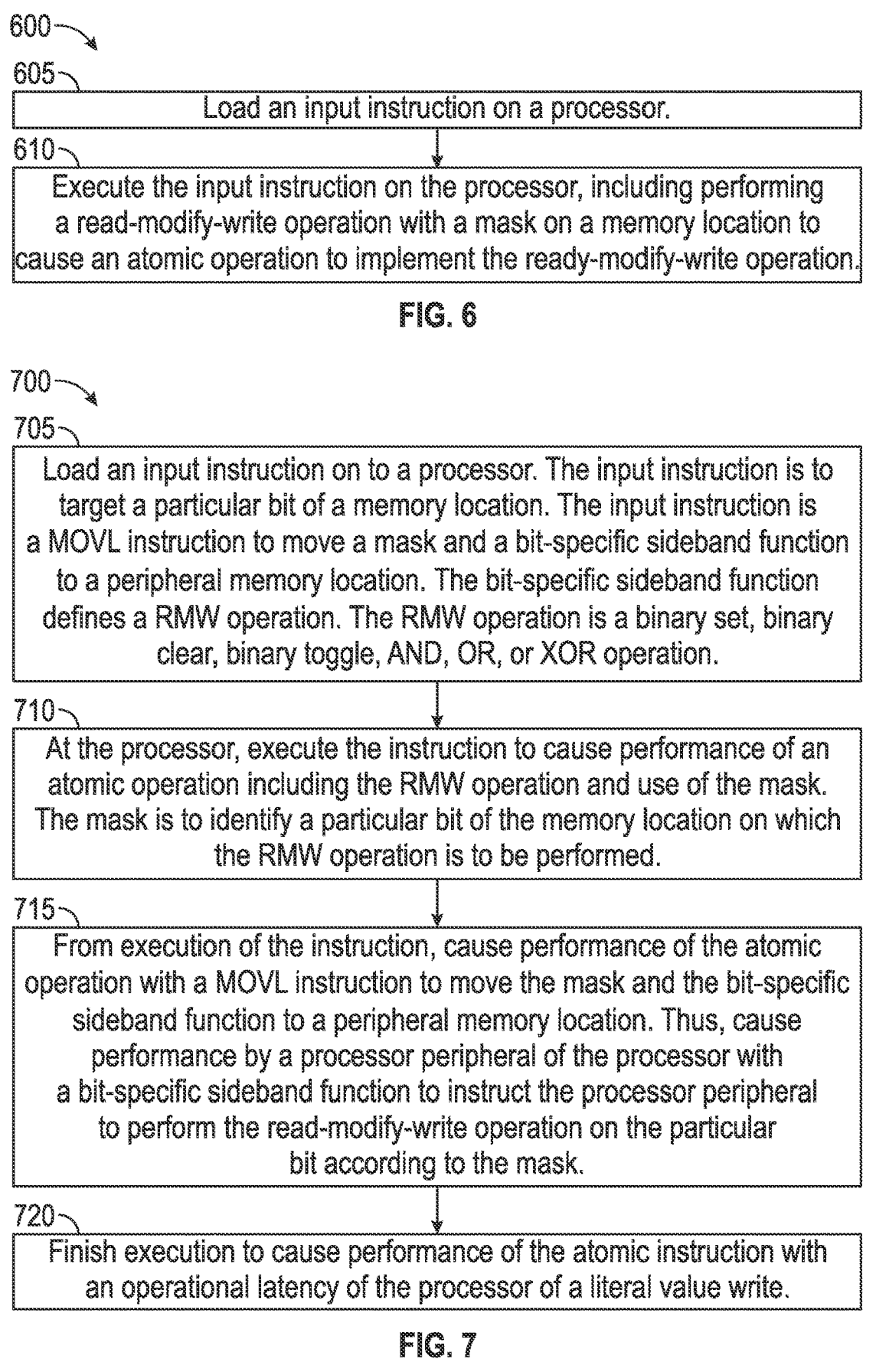

Load an input instruction on a processor.

610

Execute the input instruction on the processor, including performing a read-modify-write operation with a mask on a memory location to cause an atomic operation to implement the ready-modify-write operation.

Load an input instruction on to a processor. The input instruction is to target a particular bit of a memory location. The input instruction is a MOVL instruction to move a mask and a bit-specific sideband function to a peripheral memory location. The bit-specific sideband function defines a RMW operation. The RMW operation is a binary set, binary clear, binary toggle, AND, OR, or XOR operation.

710

At the processor, execute the instruction to cause performance of an atomic operation including the RMW operation and use of the mask. The mask is to identify a particular bit of the memory location on which the RMW operation is to be performed.

715

From execution of the instruction, cause performance of the atomic operation with a MOVL instruction to move the mask and the bit-specific sideband function to a peripheral memory location. Thus, cause performance by a processor peripheral of the processor with a bit-specific sideband function to instruct the processor peripheral to perform the read-modify-write operation on the particular bit according to the mask.

720

Finish execution to cause performance of the atomic instruction with an operational latency of the processor of a literal value write.

FIG. 7

ACCELERATED READ, MODIFY, WRITE OPERATIONS

PRIORITY

The present application claims priority to U.S. Provisional Patent Application No. 63/285,769 filed Dec. 3, 2021, the contents of which are hereby incorporated in their entirety.

TECHNICAL FIELD

The present disclosure relates to computer processing, and more particularly to accelerated read, modify, write operations.

BACKGROUND

Computer processors (e.g., microprocessors, central processing units (CPUs), digital signal processors (DSPs), digital signal controllers (DSCs), without limitation) may perform read, write, and modify operations as part of setting, clearing, or toggling bits as part of instructions performed on memory. However, inventors of examples of the present disclosure have discovered that reading peripheral memory may experience latency issues. Accordingly, a read-modify-write instruction may incur further latency.

Examples of the present disclosure address one or more of such issues.

BRIEF DESCRIPTION OF THE FIGURES

FIG. 4 is an illustration of an example method for generating accelerated read, modify, write instructions, according to examples of the present disclosure.

FIG. 5 is a more detailed illustration of an example method for generating accelerated read, modify, write instructions, according to examples of the present disclosure.

FIG. 6 is an illustration of an example method for executing accelerated read, modify, write instructions, according to examples of the present disclosure.

FIG. 7 is a more detailed illustration of an example method for executing accelerated read, modify, write instructions, according to examples of the present disclosure.

DESCRIPTION

Figure 1:
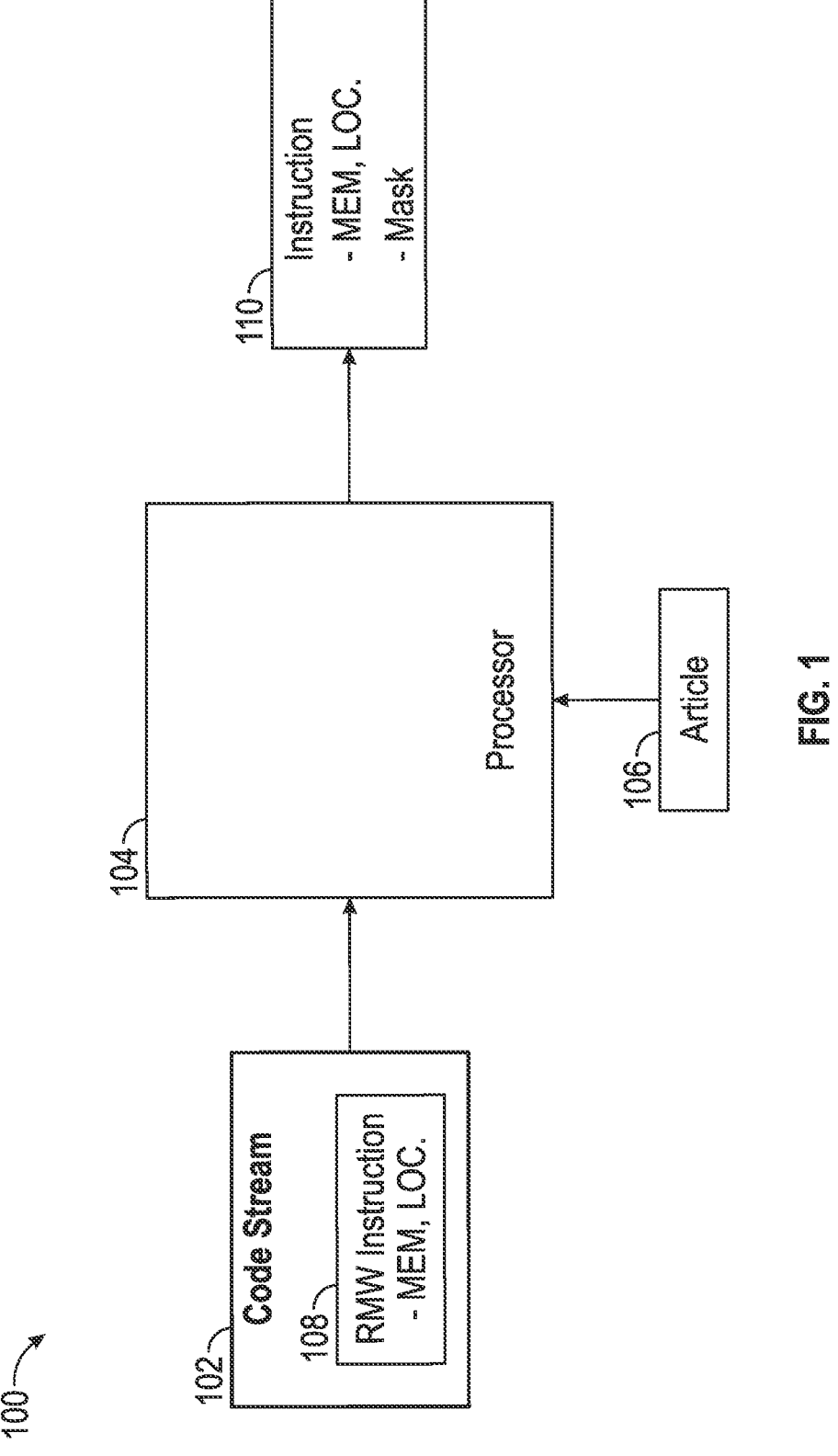
FIG. 1 is an illustration of an example system for accelerated read, modify, write instructions, according to examples of the present disclosure.

FIG. 1 is an illustration of an example system 100 for accelerated read, modify, write (RMW) instructions. RMW instructions may include any suitable instructions that, when executed by a processor, include operations such as reading a value, modifying the value, and writing the modified value back into the memory location from which the original value was read. These may be referred to as RWM operations. System 100 may be used for RMW instructions such as binary set (B SET), binary clear (BCLR), binary toggle (BTOG), logical AND or bitwise AND (AND), logical OR or bitwise OR (OR), or logical exclusive-OR or bitwise exclusive-OR (XOR). An example of such instructions is shown in FIG. 1 as instruction 108. System 100 may be configured to modify or replace instruction 108 with another instruction 110. By modifying or replacing instruction 108 with instruction 110, system 100 may facilitate mitigation of bus latency incurred during RMW operations. Instruction 110 may be executed by a target processor.

The RMW operations may be performed upon any suitable memory location. In particular, system 100 may be configured to modify or replace instruction 108 with instruction 110 when instruction 108 is to be performed on a peripheral memory location such as a special function register (SFR).

Instruction 108 may be included in a series of instructions to be executed by a target processor (which may or may not be shown). Such a series of instructions may be represented as code stream 102 in FIG. 1. Other instructions may be included in code stream 102 but not shown. Code stream 102 may be implemented in any suitable manner, such as a data structure, record, file, or code that has been partially processed.

System 100 may be configured to, with generation of instruction 110, cause the bit manipulation that was originally designated to be performed by instruction 108 to not be performed directly by a target processor, but instead by an entity such as control logic, digital circuitry, analog circuitry, or any combination thereof that is closer to, or within, a target peripheral of the target processor, wherein the bit manipulation is to be performed on data of the target peripheral. Such an entity may be, for example, within the target peripheral, bus gasket, or local bus interface. A bus gasket may include any suitable interface adapter or bridge that may allow data to be moved to or from an element of system 100 that uses a different bus protocol. Such a bus gasket may be implemented in any suitable manner, such as analog circuitry, digital circuitry, or any suitable combination thereof Execution of instruction 110, rather than instruction 108, by the target processor, may eliminate the need for the target processor to read data and manipulate it within the target processor as part of executing the RMW operation of instruction 108. Instead, the operational latency of the target processor may be reduced to latency that would be due to a literal value write as a literal value write may be used to offload the RMW operation to digital circuitry.

To generate instruction 110 based upon instruction 108, a processor may load and execute instructions. The instructions may be stored on an article 106 of manufacture. Article 106 may include a non-transitory machine-readable medium. The medium may include the instructions. The instructions, when read and executed by processor 104, may cause the processor to identify a first input instruction, such as instruction 108, in code stream 102 to be executed by a target processor, determine that the first input instruction, e.g., instruction 108, is to perform a RMW operation, determine that instruction 108 is to target a memory location, and, based on a determination that instruction 108 is to perform the RMW operation and a determination that instruction 108 is to target the memory location, convert instruction 108 to instruction 110. In one example, instruction 110 may target the memory location with a mask. Instruction 110 may target the memory location with a mask by causing an operation to be performed on the memory location, but only certain bits of the memory location according to the mask. Targeting the memory location with the mask may cause an atomic operation to be performed, when instruction 110 is executed, to implement the RMW operation. The mask may identify a bit to be manipulated in the memory location by the RMW operation.

Figure 2:
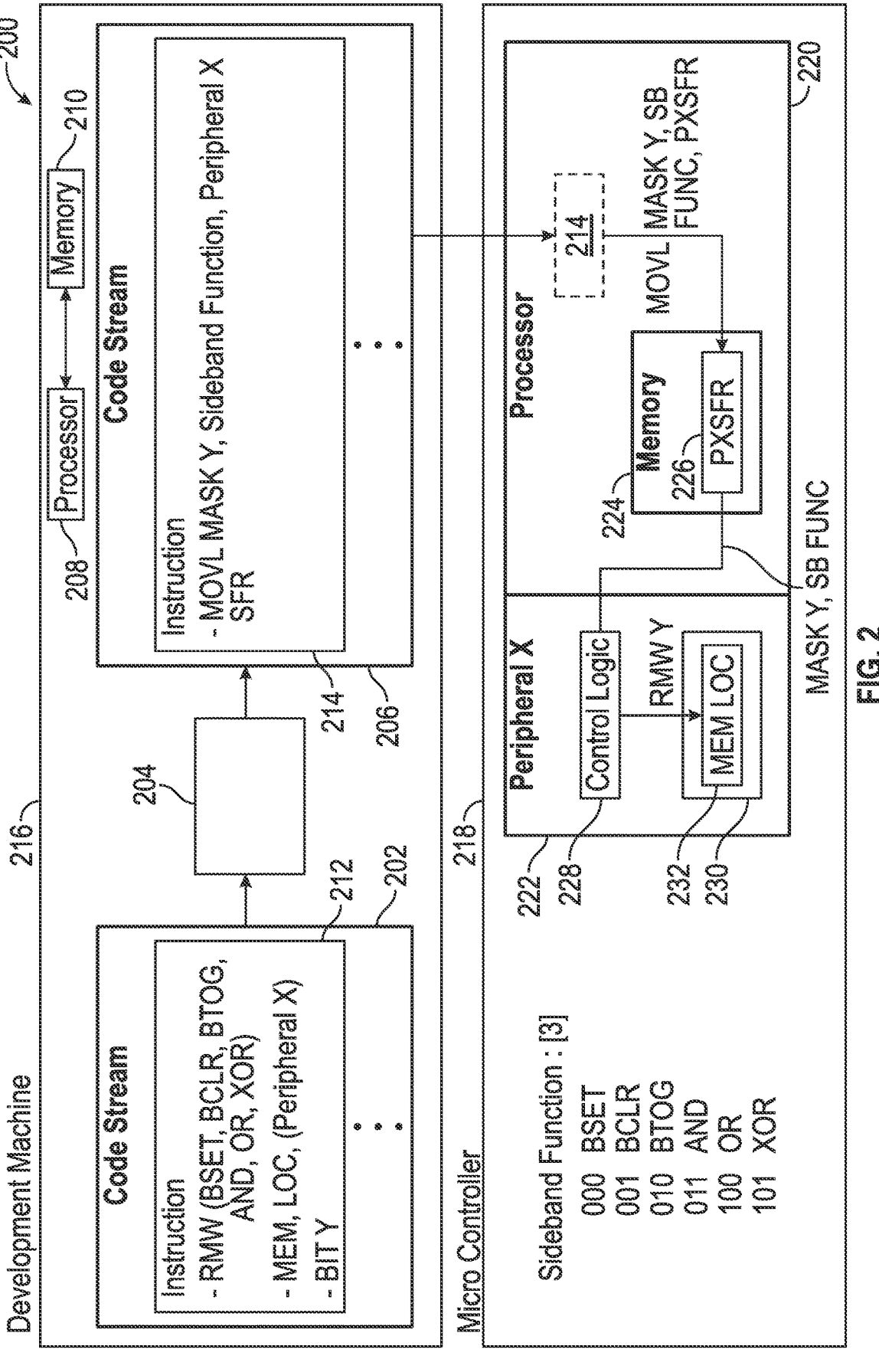
FIG. 2 is a more detailed illustration of an example system for accelerated read, modify, write instructions, according to examples of the present disclosure.

FIG. 2 is a more detailed illustration of an example system 200 for accelerated read, modify, write instructions. System 200 may implement, fully or in part, system 100 of FIG. 1. System 200 may include any suitable entity for generating code to be executed, such as a development machine 216, and any suitable entity for execution of the code, such as a microcontroller 218. Other suitable entities may be used, or the same entity may be used to both generate the code and execute the code.

Development machine 216 may include a processor 208 communicatively coupled to a memory 210. Memory 210 may include instructions that, when loaded and executed by processor 208, cause development machine 216 to perform the functionality described herein. In particular, development machine 216 may include software 204 configured to generate instructions in a code stream 206, wherein code stream 206 is to be executed by microcontroller 218. Software 204 may be implemented by instructions in memory 210 that are executed by processor 208. Software 204 may include, for example, a compiler, linker, interpreter, or any suitable entity for generating code stream 206.

Processor 208, when executing software 204, may generate code stream 206 from a source code stream 202. Source code stream 202 may include any suitable number and kind of instructions, such as instruction 212. Processor 208, when executing software 204, may replace or modify instruction 212 to be instruction 214 in code stream 206.

As discussed above within the context of instruction 102, instruction 212 may be to perform a RMW operation. Instruction 212 may be to perform such a RMW operation on a memory location. The memory location may be of, or in, a processor peripheral, denoted as peripheral X. Instruction 212 may specify a bit, given as bit Y, which is to be manipulated by the RMW operation. Instruction 212 may specify more than one such bit.

Code stream 206 may be executed by any suitable entity such as processor 220 of microcontroller 218. Microcontroller 218 may include any suitable processor peripherals, such as peripheral X 222. The processor peripherals, e.g., peripheral X 222, may include any suitable analog circuitry, digital circuitry, or combinations thereof for offloading execution of various processes of processor 220, such as pulsed width modulation, analog to digital conversion, digital to analog conversion, timers, counters, clocks, switched mode power supply, universal serial bus interfaces and controllers, controller area network interfaces and controllers, transmitters, receivers, transceivers, universal asynchronous receiver transceivers, local interconnect network bus interfaces, inter-integrated circuit interfaces, serial peripheral interfaces, display drivers, graphics processors, charge time measurement units, digital signal processors, voltage protectors, boundary scanners, sample and hold circuits, quadrant encoder interfaces, encryption and decryption circuits, direct memory access controllers, configurable logic cells, triggers, comparators, op-amps, programmable gain amplifiers, voltage references, current bias generators, current sinks, or current sources, without limitation. Processor peripherals may be included in a same die as the processor. Instruction 212 may be provided to change data to be used by such peripherals by accessing a given memory location 232. Memory location 232 may be included in, or may be adjacent to, peripheral X 222. Processor 220 may include any suitable memory for use by processor 220, such as memory 224. Moreover, memory 224 may be included in, or may be adjacent to, processor 220. Access by processor 220 of memory 224 may be much faster than access by processor 220 of memory 230.

Processor 208, when executing software 204, may determine that the RMW operation of instruction 212 is to be performed on a processor peripheral of a target processor, such as peripheral X 222 of processor 220. This determination may be made with reference to the memory location targeted by instruction 212, which may be a special function register (SFR) of a processor peripheral. Based upon a determination that the RMW operation is to be performed on the processor peripheral, processor 208, when executing software 204, may convert instruction 212 to instruction 214. Instruction 214, when executed by processor 220, may be configured to cause performance of the RMW operation of instruction 212 in an atomic manner by the processor peripheral designated by the memory location of instruction 212. Processor 208, when executing software 204, may be thus configured to determine that instruction 212 is to target a particular bit of the memory location for the peripheral of the target (designated as bit Y) and, based on a determination that instruction 212 is to perform the RMW operation and is to target bit Y, convert instruction 212 to instruction 214 to target the memory location with a mask which identifies bit Y.

Processor 208, when executing software 204, may be configured to generate instruction 214 to cause the RMW operation of instruction 212 to be performed by the peripheral designated by the memory location of instruction 212 in any suitable manner. Processor 208, when executing software 204, may be configured to generate instruction 214 as a move instruction such as a MOVL instruction. The MOVL instruction may include a mask to target the bit or bits, designated by Y, which are to be manipulated by the original instruction 212. The MOVL instruction may include a sideband function. The sideband function may include generation of signals that direct a function at the target. The sideband function may be bit-specific when used in conjunction with the mask, affecting only certain bits identified by the mask. The sideband function may instruct the peripheral to perform the RMW operation on a bit of a memory location according to the mask. The sideband function may be designated by a bit code and may identify the operation—such as set, clear, toggle, AND, OR, or XOR—that is to be performed upon the bit or bits designated by Y by instruction 212. For example, a sideband function code of 000 may designate a bit set (BSET) operation; 001 may designate a bit clear (BCLR) operation; 010 may designate a bit toggle (BTOG) operation; 011 may designate an AND operation; 100 may designate an OR operation; and 101 may designate an XOR operation. Instruction 214 may designate a memory location that may be read by peripheral X 222 to read the other contents of instruction 214, such as the mask and sideband function.

For example, processor 208, when executing software 204, may be configured to generate instruction 214 to include the MOVL instruction with a mask designating affected bit or bits Y and the sideband function.

Processor 208, when executing software 204, may be configured to designate that the MOVL instruction is to move the mask and the sideband function to any suitable peripheral memory location. In one example, processor 208, when executing software 204, may be configured to designate that the MOVL instruction is to move the value of the mask and the sideband function into a memory location of processor 220, rather than the memory location at peripheral X 222. Thus, the MOVL instruction may move the value of the mask and the sideband function into memory 224 rather than memory 230. The MOVL instruction may be configured to move the value of the mask and the sideband function into, for example, memory location 226, which may be a SFR for peripheral X in memory 224 of processor 220. In another example, not shown, memory location 226 may be located within a memory such as memory 230 of peripheral X 222.

Peripheral X 222 may be configured to read the contents written by the MOVL operation written to memory location 226. Based upon such contents, peripheral X 222 may be configured to perform the RMW operation specified by source instruction 212. Peripheral X 222 may be configured to perform such an operation with any suitable mechanism, such as a control logic 228. Control logic 228 may be implemented by analog circuitry, digital circuitry, or any suitable combination thereof. Control logic 228 may perform the RMW specified by the sideband function upon the bit or bits specified by the mask. Control logic 228 may be included in a peripheral bus bridge of peripheral X 222, but may still considered to be included in peripheral X 222. Control logic 228 may perform the read of memory location 232, the operation using the mask and specified by the sideband function and write the result back into memory location 232. The RMW operation may be performed using an atomic operation. The atomic operation with respect to the RMW operation may be atomic with respect to control logic 228, as opposed to processor 220. The atomic nature of the operation may include, once initiated, that the operation cannot be interrupted and acts as a single operation despite being implemented with multiple steps or cycles.

Concurrently with, and after, performing the MOVL operation, processor 220 may continue to operate and execute other instructions. Thus, for processor 220, causing execution of the RMW operation has an operational latency that is that of a literal value write. This is in contrast to processor 220 executing instruction 212 and directly performing the RMW operation, which would have longer latency.

As an example, code stream 202 may include an instance of instruction 212 that specified the following pseudocode, which is given for illustrative purposes and is not to be considered direct syntax for execution:

[OR, XOR, AND, BSET, BCLR, BTOG] BIT (Y) IN [SFRX]

Processor 208, when executing software 204, may identify that instruction 212 includes an eligible opcode (OR, XOR, AND, BSET, BCLR, BTOG) and an eligible target designation (SFRX—(in peripheral X 222)). Processor 208, when executing software 204, may generate a mask to match the length and position of BIT (Y). BIT (Y) may specify more than one bit. This may be given as, for an example bit 1 in the second lowest bit position:

MASK[BYTE LENGTH]={0 0 0 0 0 0 1 0}

Processor 208, when executing software 204, may identify a sideband function corresponding to the opcode from instruction 212. This may be given as SIDEBAND [3]. Instruction 214 may thus be generated and given as, for example:

MOVL (MASK+SIDEBAND, SFRX)

wherein a combination of the mask and the sideband are moved into the peripheral memory location.

Figure 3:
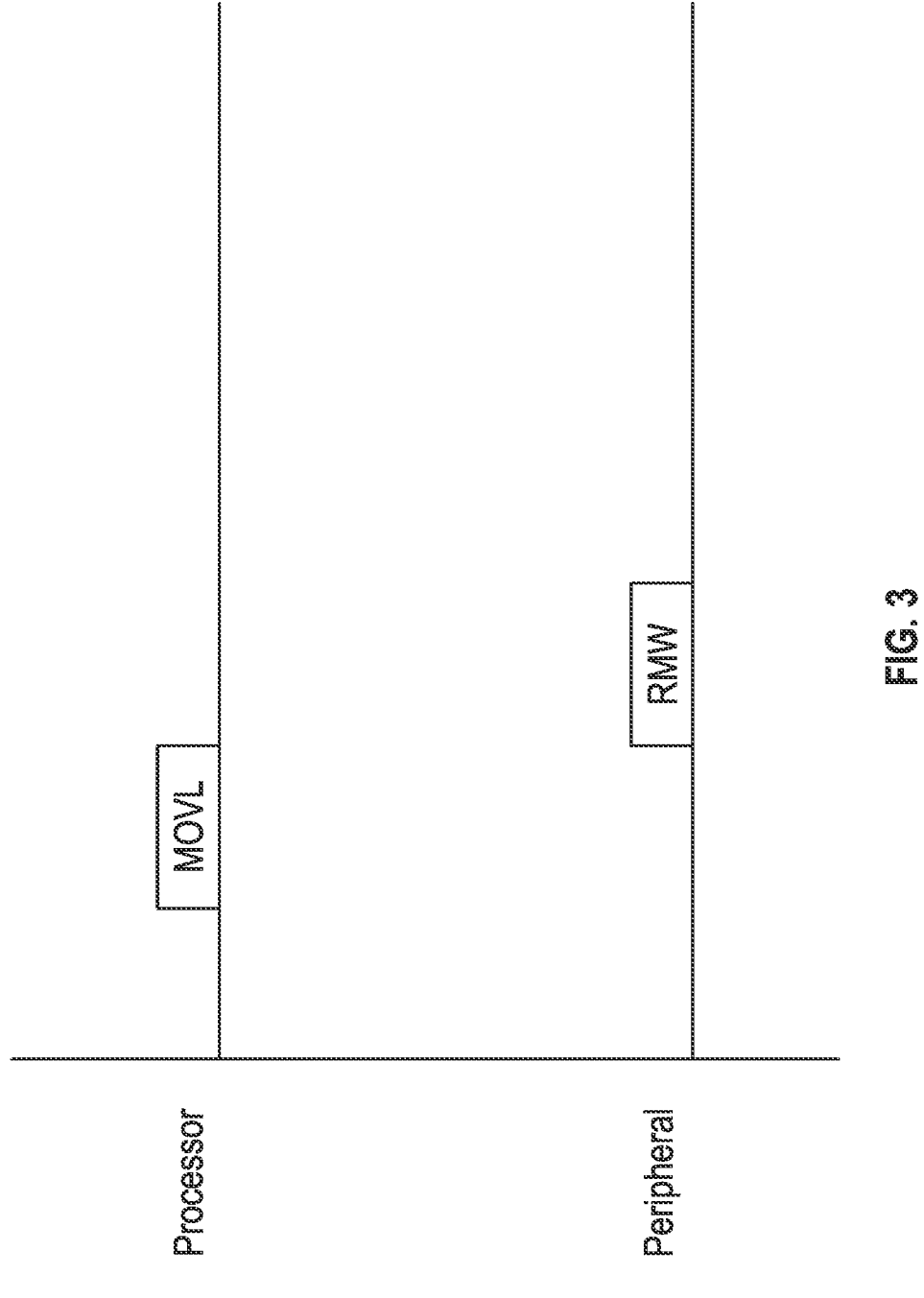
FIG. 3 is an illustration of latency for execution of accelerated read, modify, write instructions, according to examples of the present disclosure.

FIG. 3 is an illustration of latency for execution of accelerated read, modify, write instructions. The MOVL operation, performed by processor 220, may take a single execution cycle. However, the RMW operation of an RMW instruction may take much longer than a single execution cycle. Thus, by performing the RMW operation (which may be atomic) through moving values for execution by peripheral 222, processor 220 does not experience such a long latency as would occur if processor 220 executed the RMW operation.

FIG. 4 is an illustration of an example method 400 for generating accelerated read, modify, write instructions. Method 400 may be performed by any suitable mechanism, such as by system 100 or processor 104 of FIG. 1 utilizing instructions of article 106, or development machine 216, software 204, or processor 208 and memory 210 of FIG. 2. Method 400 may include more or fewer steps than shown in FIG. 4. The steps of method 400 may be optionally repeated, omitted, performed in a different order, performed recursively, performed in parallel with each other or with other instances of method 400.

At 405, a first input instruction in a code stream to be executed may be identified.

At 410, it may be determined that the first input instruction is to perform a read-modify-write operation to target a memory location.

At 415, based on a determination that the first input instruction is to perform the read-modify-write operation to target the memory location, the first input instruction may be converted to a second input instruction to target the memory location with a mask to cause an atomic operation to implement the read-modify-write operation.

FIG. 5 is a more detailed illustration of an example method 500 for generating accelerated read, modify, write instructions. Method 500 may be performed by any suitable mechanism, such as by system 100 or processor 104 of FIG. 1 utilizing instructions of article 106, or development machine 216, software 204 executed by processor 208 and memory 210 of FIG. 2. Method 500 may include more or fewer steps than shown in FIG. 5. The steps of method 500 may be optionally repeated, omitted, performed in a different order, performed recursively, performed in parallel with each other or with other instances of method 500. Method 500 may implement, fully or in part, method 400.

At 505, a first input instruction in a code stream to be executed may be identified. The first input instruction is a binary set, binary clear, binary toggle, AND, OR, or XOR instruction.

At 510, it may be determined that the first input instruction is to perform a read-modify-write operation to target a particular bit of a memory location.

At 515, it may be determined that the read-modify-write operation of the first input instruction is to be executed by a processor peripheral.

At 520, it may be determined that the first input instruction is to target a particular bit of the memory location.

At 525, based on a determination that the first input instruction is to perform the read-modify-write operation to target the memory location and is to be executed by the processor peripheral, the first input instruction may be converted to a second input instruction. This may include steps 530-550.

At 530, the second input instruction may be implemented to cause to target the memory location with a mask to cause an atomic operation to implement the read-modify-write operation. Based on a determination that the first input instruction is to target the particular bit of the memory location, the mask may be used to identify the particular bit of the memory location.

At 535, the second input instruction may be implemented to cause the atomic operation to be executed by the processor peripheral with the mask.

At 540, the second input instruction may include a bit-specific sideband function to instruct the processor peripheral to perform a read-modify-write operation on the particular bit according to the mask.

At 545, the second input instruction may be implemented as a MOVL instruction to move the mask and the bit-specific sideband function to a peripheral memory location. The MOVL instruction is to be executed with an operational latency of a literal value write for a target processor.

FIG. 6 is an illustration of an example method 600 for executing accelerated read, modify, write instructions. Method 600 may be performed by any suitable mechanism, such as by microcontroller 218, processor 220, peripheral X 222, or control logic 228 of FIG. 2. Method 600 may include more or fewer steps than shown in FIG. 6. The steps of method 600 may be optionally repeated, omitted, performed in a different order, performed recursively, performed in parallel with each other or with other instances of method 600.

At 605, an input instruction may be loaded on a processor.

At 610, the input instruction may be executed on the processor. This may include performing a read-modify-write operation with a mask on a memory location to cause an atomic operation to implement the ready-modify-write operation.

FIG. 7 is a more detailed illustration of an example method 600 for executing accelerated read, modify, write instructions. Method 700 may be performed by any suitable mechanism, such as by microcontroller 218, processor 220, peripheral X 222, or control logic 228 of FIG. 2. Method 700 may include more or fewer steps than shown in FIG. 7. The steps of method 700 may be optionally repeated, omitted, performed in a different order, performed recursively, performed in parallel with each other or with other instances of method 700. Method 700 may implement, fully or in part, method 500.

At 705, an input instruction may be loaded on to a processor. The input instruction may be to target a particular bit of a memory location. The input instruction may be a MOVL instruction to move a mask and a bit-specific sideband function to a peripheral memory location. The bit-specific sideband function may define a RMW operation. The RMW operation may be a binary set, binary clear, binary toggle, AND, OR, or XOR operation.

At 710, at the processor, the instruction may be executed to cause performance of an atomic operation including the RMW operation and use of the mask. The mask may be to identify a particular bit of the memory location on which the RMW operation is to be performed.

At 715, from the execution of the instruction, performance of the atomic operation may be caused with the MOVL instruction to move the mask and the bit-specific sideband function to the peripheral memory location. Performance by a processor peripheral of the processor may be caused with the bit-specific sideband function to instruct the processor peripheral to perform the read-modify-write operation on the particular bit according to the mask.

At 720, execution at the processor may be finished while execution at the peripheral continues to cause performance of the atomic instruction with an operational latency of the processor of a literal value write.

Examples of the present disclosure may include an article of manufacture. The article may include a non-transitory machine-readable medium. The medium may include instructions. The instructions, when read and executed by a processor, may cause the processor to determine that a first input instruction in a code stream to be executed is to perform a read-modify-write operation, determine that the first input instruction is to target a memory location, and, based on a determination that the first input instruction is to perform the read-modify-write operation and the determination that the first input instruction is to target the memory location, convert the first input instruction to a second input instruction to target the memory location with a mask to cause an atomic operation to implement the read-modify-write operation.

In combination with any of the above embodiments, the instructions may be to cause the processor to determine that the read-modify-write operation of the first input instruction is to be executed by a processor peripheral, and, based on a determination that the read-modify-write operation of the first input instruction is to be executed by the processor peripheral, convert the first input instruction to the second input instruction to cause the read-modify-write operation to be executed by the processor peripheral.

In combination with any of the above embodiments, the instructions may be to cause the processor to convert the first input instruction to the second input instruction through inclusion of a bit-specific sideband function to instruct the processor peripheral to perform the read-modify-write operation on a bit of the memory location according to the mask.

In combination with any of the above embodiments, the instructions may be to cause the processor to implement the second input instruction as a MOVL instruction to move the mask and the bit-specific sideband function to a peripheral memory location.

In combination with any of the above embodiments, the instructions may be to cause the processor to determine that the first input instruction is to target a particular bit of the memory location and, based on the determination that the first input instruction is to perform the read-modify-write operation and is to target the particular bit of the memory location, convert the first input instruction to the second input instruction to target the memory location with the mask. The mask may be to identify the particular bit of the memory location.

In combination with any of the above embodiments, the first input instruction may be a binary set, binary clear, binary toggle, AND, OR, or XOR instruction.

In combination with any of the above embodiments, the second input instruction may be to target the memory location with the mask to cause the atomic operation to implement the read-modify-write operation with an operational latency of a literal value write for a target processor.

Examples of the present disclosure may include an article of manufacture. The article may include a non-transitory machine-readable medium. The medium may include instructions. The instructions, when read and executed by a processor, may cause the processor to perform a read-modify-write operation through use of a mask on a memory location to cause an atomic operation to implement the read-modify-write operation.

In combination with any of the above examples, the atomic operation may be to be performed by a processor peripheral of the processor, and the instructions may be to cause the processor to cause performance of the atomic operation by the processor peripheral with the mask.

In combination with any of the above examples, the instructions may be to cause the processor to cause performance of the atomic operation by the processor peripheral through issuance of a bit-specific sideband function to instruct the processor peripheral to perform the read-modify-write operation on a bit according to the mask.

In combination with any of the above examples, the instructions may be to cause the processor to cause performance of the atomic operation with a MOVL instruction to move the mask and the bit-specific sideband function to a peripheral memory location.

In combination with any of the above examples, the input instruction may be to target a particular bit of the memory location and the instructions are to cause the processor to target the memory location with the mask, the mask to identify the particular bit of the memory location.

In combination with any of the above examples, the read-modify-write operation may be a binary set, binary clear, binary toggle, AND, OR, or XOR operation.

In combination with any of the above examples, the instructions may be to cause the processor to cause performance of the atomic operation with an operational latency of the processor of a literal value write.

Examples of the present disclosure may include a microcontroller. The microcontroller may include a processor. The processor may be configured to execute any of the instructions of the above examples.

Examples of the present disclosure may include a peripheral circuit. The peripheral circuit may be implemented by analog circuitry, digital circuitry, control logic, or any suitable combination thereof. The peripheral circuit may be to perform operations on behalf of the processor peripheral to execute any of the instructions of the above examples.

Examples of the present disclosure may include an apparatus. The apparatus may include any of the above microcontrollers and peripheral circuits of the above examples. The peripheral circuits may be included in the microcontrollers and may be separate from the processors of the microcontrollers.

Examples of the present disclosure may include a method to perform operations of any of the above articles, microcontrollers, processors, peripheral circuits, or apparatuses.

Examples of the present disclosure may include a method. The method may include loading an input instruction on a processor, and executing the input instruction on the processor, the input instruction to cause performance of a read-modify-write operation, including using a mask on a memory location to cause an atomic operation to implement the ready-modify-write operation.

In combination with any of the above examples, the method may include causing performance of the atomic operation by a processor peripheral of the processor with the mask.

In combination with any of the above examples, the method may include causing performance of the atomic operation by the processor peripheral with a bit-specific sideband function to instruct the processor peripheral to perform the read-modify-write operation on a bit according to the mask.

In combination with any of the above examples, the method may include causing performance of the atomic instruction with a MOVL instruction to move the mask and the bit-specific sideband function to a peripheral memory location.

In combination with any of the above examples, the input instruction may be to target a particular bit of the memory location and the method comprises causing performance of the atomic instruction by targeting the memory location with the mask, the mask to identify the particular bit of the memory location.

In combination with any of the above examples, the read-modify-write operation may be a binary set, binary clear, binary toggle, AND, OR, or XOR operation.

In combination with any of the above examples, the method may include, at a processor, causing performance of the atomic instruction with an operational latency of the processor of a literal value write.

Examples of the present disclosure may include a method. The method may include identifying a first input instruction in a code stream to be executed, determining that the first input instruction is to perform a read-modify-write operation to target a memory location, and, based on the determination that the first input instruction is to perform the read-modify-write operation to target the memory location, converting the first input instruction to a second input instruction to target the memory location with a mask to cause an atomic operation to implement the read-modify-write operation.

In combination with any of the above examples, the method may include determining that the read-modify-write operation of the first input instruction is to be executed by a processor peripheral, and, based on a determination that the read-modify-write operation of the first input instruction is to be executed by the processor peripheral, converting the first input instruction to the second input instruction to cause the atomic operation to be executed by the processor peripheral with the mask.

In combination with any of the above examples, converting the first input instruction to the second input instruction may include providing a bit-specific sideband function to instruct the processor peripheral to perform a read-modify-write operation on a bit according to the mask.

In combination with any of the above examples, the method may include implementing the second input instruction as a MOVL instruction to move the mask and the bit-specific sideband function to a peripheral memory location.

In combination with any of the above examples, the method may include determining that the first input instruction is to target a particular bit of the memory location and, based on a determination that the first input instruction is to perform the read-modify-write operation and is to target the particular bit of the memory location, converting the first input instruction to the second input instruction to target the memory location with the mask, the mask to identify the particular bit of the memory location.

In combination with any of the above examples, the first input instruction may be a binary set, binary clear, binary toggle, AND, OR, or XOR instruction.

In combination with any of the above examples, the second input instruction may target the memory location with the mask to cause the atomic operation to implement the read-modify-write operation is executed with an operational latency of a literal value write for a target processor.

Although example embodiments have been described above, other variations and embodiments may be made from this disclosure without departing from the spirit and scope of these embodiments.

The invention claimed is:

1. An article of manufacture comprising a non-transitory machine-readable medium, the medium comprising instructions, the instructions, when read and executed by a processor, cause the processor to:

determine that a first input instruction in a code stream to be executed by a processor of a microcontroller is to perform a read-modify-write operation;

determine that the first input instruction is to target a memory location included in a peripheral of the processor of the microcontroller;

based on determining that the first input instruction in the code stream to be executed by the processor of the microcontroller is to perform the read-modify-write operation and determining that the first input instruction is to target the memory location included in the peripheral of the processor of the microcontroller, convert the first input instruction to a second input instruction to target the memory location included in the peripheral of the processor of the microcontroller with a mask to cause an atomic operation to implement the read-modify-write operation;

determine that the read-modify-write operation of the first input instruction is to be executed by the peripheral of the processor of the microcontroller;

based on determining that the read-modify-write operation of the first input instruction is to be executed by the peripheral of the processor of the microcontroller, convert the first input instruction to the second input instruction to cause the read-modify-write operation to be executed by the peripheral of the processor of the microcontroller; and convert the first input instruction to the second input instruction through inclusion of a bit-specific sideband function, the bit-specific sideband function identifying an operation different from an operation of the second input instruction, to instruct the peripheral of the processor of the microcontroller to perform the read-modify-write operation on a bit of the memory location according to the mask.

2. The article of manufacture of claim 1, wherein the instructions are to cause the processor to implement the second input instruction as a MOVL instruction to move the mask and the bit-specific sideband function to the memory location.

3. The article of manufacture of claim 1, wherein the instructions are to further cause the processor to determine that the first input instruction is to target a particular bit of the memory location; and wherein, to convert the first input instruction to the second input instruction, the instructions are to further cause the processor to, based on determining that the first input instruction is to perform the read-modify-write operation and is to target the particular bit of the memory location, target the memory location with the mask, the mask to identify the particular bit of the memory location.

4. The article of manufacture of claim 1, wherein the first input instruction is a binary set, binary clear, binary toggle, AND, OR, or XOR instruction.

5. The article of manufacture of claim 4, wherein the operation identified by the bit-specific sideband function is a bit set operation, a bit clear operation, a bit toggle operation, an AND operation, an OR operation, or an XOR operation.

6. The article of manufacture of claim 1, wherein the second input instruction to target the memory location with the mask to cause the atomic operation to implement the read-modify-write operation with an operational latency of a literal value write for the processor of the microcontroller.

7. The article of manufacture of claim 1, wherein the operation identified by the bit-specific sideband function is a bit set operation, a bit clear operation, a bit toggle operation, an AND operation, an OR operation, or an XOR operation.

8. A method, comprising:

identifying a first input instruction in a code stream to be executed by a processor of a microcontroller;

determining that the first input instruction is to perform a read-modify-write operation to target a memory location included in a peripheral of the processor of the microcontroller;

based on determining that the first input instruction is to perform the read-modify-write operation to target the memory location included in the peripheral of the processor of the microcontroller, converting the first input instruction to a second input instruction to target the memory location included in the peripheral of the processor of the microcontroller with a mask to cause an atomic operation to implement the read-modify-write operation; and determining that the read-modify-write operation of the first input instruction is to be executed by the peripheral of the processor of the microcontroller;

wherein the converting the first input instruction to the second input instruction includes, based on the determining that the read-modify-write operation of the first input instruction is to be executed by the peripheral of the processor of the microcontroller, converting the first input instruction to the second input instruction to cause the atomic operation to be executed by the peripheral of the processor of the microcontroller with the mask;

wherein the converting the first input instruction to the second input instruction includes providing a bit-specific sideband function, the bit-specific sideband function identifying an operation different from an operation of the second input instruction, to instruct the peripheral to perform the read-modify-write operation on a bit according to the mask.

9. The method of claim 8, comprising implementing the second input instruction as a MOVL instruction to move the mask and the bit-specific sideband function to the memory location.

10. The method of claim 8, comprising determining that the first input instruction is to target a particular bit of the memory location;

wherein the converting the first input instruction to the second input instruction includes, based on the determining that the first input instruction is to perform the read-modify-write operation and is to target the particular bit of the memory location, converting the first input instruction to the second input instruction to target the memory location with the mask, the mask to identify the particular bit of the memory location.

11. The method of claim 8, wherein the first input instruction is a binary set, binary clear, binary toggle, AND, OR, or XOR instruction.

12. The method of claim 11, wherein the operation identified by the bit-specific sideband function is a bit set operation, a bit clear operation, a bit toggle operation, an AND operation, an OR operation, or an XOR operation.

13. The method of claim 8, wherein the second input instruction to target the memory location with the mask to cause the atomic operation to implement the read-modify-write operation is executed with an operational latency of a literal value write for the processor of the microcontroller.

14. The method of claim 8, wherein the operation identified by the bit-specific sideband function is a bit set operation, a bit clear operation, a bit toggle operation, an AND operation, an OR operation, or an XOR operation.

15. An article of manufacture comprising a non-transitory machine-readable medium, the medium comprising instructions, the instructions, when read and executed by a processor, cause the processor to execute a first input instruction, the first input instruction to perform a read-modify-write operation through use of a mask on a memory location of a peripheral of a microcontroller to cause an atomic operation to implement the read-modify-write operation;

wherein:

the atomic operation is to be performed by the peripheral of the microcontroller;

the instructions are to cause the processor to cause performance of the atomic operation by the peripheral of the microcontroller with the mask;

the instructions are to cause the processor to cause performance of the atomic operation by the peripheral of the microcontroller through issuance of a second input instruction including a bit-specific sideband function, the bit-specific sideband function identifying an operation different from an operation of the second input instruction, to instruct the peripheral of the microcontroller to perform the read-modify-write operation on a bit according to the mask.

16. The article of manufacture of claim 15, wherein the instructions are to cause the processor to cause performance of the atomic operation with a MOVL instruction to move the mask and the bit-specific sideband function to the memory location.

17. The article of manufacture of claim 15, wherein the input instruction is to target a particular bit of the memory location and the instructions are to cause the processor to target the memory location with the mask, the mask to identify the particular bit of the memory location.

18. The article of manufacture of claim 15, wherein the read-modify-write operation is a binary set, binary clear, binary toggle, AND, OR, or XOR operation.

19. The article of manufacture of claim 18, wherein the operation identified by the bit-specific sideband function is a bit set operation, a bit clear operation, a bit toggle operation, an AND operation, an OR operation, or an XOR operation.

20. The article of manufacture of claim 15, wherein instructions are to cause the processor to cause performance of the atomic operation with an operational latency of the processor of a literal value write.

21. The article of manufacture of claim 15, wherein the operation identified by the bit-specific sideband function is a bit set operation, a bit clear operation, a bit toggle operation, an AND operation, an OR operation, or an XOR operation.

22. A method, comprising:

loading a first input instruction on a processor;

executing the first input instruction on the processor, the first input instruction to cause performance of a read-modify-write operation, including using a mask on a memory location of a peripheral of a microcontroller to cause an atomic operation to implement the ready-modify-write operation;

causing performance of the atomic operation by the peripheral with the mask; and causing performance of the atomic operation by the peripheral with a second input instruction including a bit-specific sideband function, the bit-specific sideband function identifying an operation different from an operation of the second input instruction, to instruct the peripheral to perform the read-modify-write operation on a bit according to the mask.

23. The method of claim 22, comprising causing performance of the atomic instruction with a MOVL instruction to move the mask and the bit-specific sideband function to the memory location.

24. The method of claim 22, wherein the input instruction is to target a particular bit of the memory location and the method comprises causing performance of the atomic instruction by targeting the memory location with the mask, the mask to identify the particular bit of the memory location.

25. The method of claim 22, wherein the read-modify-write operation is a binary set, binary clear, binary toggle, AND, OR, or XOR operation.

26. The method of claim 25, wherein the operation identified by the bit-specific sideband function is a bit set operation, a bit clear operation, a bit toggle operation, an AND operation, an OR operation, or an XOR operation.

27. The method of claim 22, comprising, at the processor, causing performance of the atomic instruction with an operational latency of the processor of a literal value write.

28. The method of claim 22, wherein the operation identified by the bit-specific sideband function is a bit set operation, a bit clear operation, a bit toggle operation, an AND operation, an OR operation, or an XOR operation.

* * * * *